(12) United States Patent
Hu et al.

(10) Patent No.: US 9,010,980 B2
(45) Date of Patent: Apr. 21, 2015

(54) LIGHT GUIDE PLATE AND BACKLIGHT MODULE CONTAINING SAME

(75) Inventors: Chechang Hu, Guangdong (CN); Hu He, Guangdong (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 379 days.

(21) Appl. No.: 13/518,386

(22) PCT Filed: May 10, 2012

(86) PCT No.: PCT/CN2012/075271
§ 371 (c)(1),
(2), (4) Date: Jun. 21, 2012

(87) PCT Pub. No.: WO2013/159402
PCT Pub. Date: Oct. 31, 2013

(65) Prior Publication Data
US 2013/0286681 A1    Oct. 31, 2013

(30) Foreign Application Priority Data
Apr. 28, 2012    (CN) .......................... 2012 1 0132935

(51) Int. Cl.
*F21V 7/04*    (2006.01)
*F21V 8/00*    (2006.01)

(52) U.S. Cl.
CPC ............ *G02B 6/0055* (2013.01); *G02B 6/0091* (2013.01)

(58) Field of Classification Search
CPC ...... G02B 6/00; G02B 6/0011; G02B 6/0013; G02B 6/0015; G02B 6/0018; G02B 6/0025; G02B 6/0031; G02B 6/0033; G02B 6/0035; G02B 6/005; G02B 6/0051; G02B 6/0055
USPC ......... 362/608–610, 615, 617–619, 623–625, 362/627
See application file for complete search history.

(56) References Cited

U.S. PATENT DOCUMENTS

2005/0105014 A1*    5/2005    Hong .............................. 349/65

FOREIGN PATENT DOCUMENTS

| CN | 101696780 A | 4/2010 |
|----|-------------|--------|
| CN | 201680234 U | 12/2010 |

\* cited by examiner

*Primary Examiner* — Thomas M Sember
(74) *Attorney, Agent, or Firm* — Cheng-Ju Chiang

(57) ABSTRACT

The present invention provides a light guide plate and a backlight module containing the light guide plate. The light guide plate includes a plate body and a coating layer formed on the plate body. The plate body includes a bottom face, a top face opposite to the bottom face, and a plurality of side faces between the bottom face and the top face. The coating layer is formed on at least one side edge of the top face. The coating layer has a refractive index that is greater than or equal to 1 and less than refractive index of the plate body. The light guide plate uses the coating layer formed on the top face to reflect light back into the light guide plate to confine the light within the light guide plate so as to prevent light leakage and ensure light intensity and homogeneity of the light guide plate.

11 Claims, 6 Drawing Sheets

LIGHT GUIDE PLATE AND BACKLIGHT MODULE CONTAINING SAME

BACKGROUND OF THE INVENTION

1. Field of the Invention

The present invention relates to the field of liquid crystal displaying, and in particular to a light guide plate with coating layer and a backlight module containing the light guide plate.

2. The Related Arts

Liquid crystal display (LCD) has a variety of advantages, such as compact device size, low power consumption, and being free of radiation, and is thus widely used. Most of the LCDs that are currently available in the market are backlighting LCDs, which comprise a liquid crystal panel and a backlight module. The working principle of the liquid crystal panel is that liquid crystal molecules are interposed between two parallel glass substrates and a plurality of vertical and horizontal fine electrical wires is arranged between the two glass substrates, whereby the liquid crystal molecules are controlled to change direction by application of electricity in order to refract light emitting from the backlight module for generating images. Since the liquid crystal panel itself does not emit light, light must be provided by the backlight module in order to normally display images. Thus, the backlight module is one of the key components of an LCD. The backlight module can be classified as two types, namely side-edge backlight module and direct backlight module, according to the position where light gets incident. The direct backlight module arranges a light source, such as a cold cathode fluorescent lamp (CCFL) or a light-emitting diode (LED) at the back side of the liquid crystal panel to form a planar light source that directly provides lighting to the liquid crystal panel. The side-edge backlight module arranges a backlight source, such as an LED light bar based light source, at an edge of a back panel that is located rearward of one side of the liquid crystal panel. The LED light bar emits light that enters a light guide plate through a light incident face of the light guide plate and is projected out through a light exit face after being reflected and diffused to thereby form, after transmitting through a set of optic films, a planar light source to be provided to the liquid crystal panel.

Referring to FIG. 1, the technical progress of using an LED light bar 100 as a light source makes a slim-bezel backlight module a promising trend of future development. To realize a design of slim bezel while ensuring reliability of an optic film assembly 200, the margin of the optic film assembly 200 that is depressed down and retained by a mold frame 300 is often of a very limited width so that it is often that the optic film assembly 200 is made extending to an edge of a light guide plate 400 in order to prevent the optic film assembly 200 from sliding off the backlight module. In this arrangement, the light incident end of the light guide plate 400 allows light from the LED light bar 100 to directly enter the optic film assembly 200 to be then reflected and directly projected outward.

To handle such a problem, a commonly used arrangement is to provide a shielding wall 302' on a mold frame 300' (see FIG. 2), in order to block light from directly entering the optic film assembly 200.

Yet, as shown in FIG. 3, due to the function of depressing and retaining effected by the mould frame 300', the optic film assembly 200 is often stuck to the light guide plate 400, causing change of total internal reflection and thus allowing light to directly pass through the light guide plate 400 to enter optic film assembly 200 (propagation direction of light being indicated by arrows) so as to form bright lines along the light incident end of the light guide plate 400 and lead to loss of light.

Researches have shown that light leakage resulting from the optic film assembly being stuck to the light guide plate is because the light guide plate often has an index of refraction that is close to the optic films. Taking a light guide plate made of PMMA (poly methyl methacrylate) and an optic film made of PET (poly ethylene terephthalate) as an example, PMMA has a refractive index of 1.49, while PET has a refractive index that is greater than 1.50. When light travels in the light guide plate toward the contact interface, the light is moving from an optically thin medium into an optically thick medium. Thus, the light does not undergo total internal reflection and directly transmits into the optic films, thereby leading to light leakage.

Further, as shown in FIG. 4, to prevent light from emitting from a side face of the light guide plate 400, a non-incidence side face of the light guide plate 400 is often attached with a side reflection plate 500, which functions to allow light that emits out of the side face of the light guide plate 400 to be reflected back into the light guide plate by the side reflection plate 500 for increasing utilization efficiency of light. However, since the interface where the side reflection plate 500 is attached to the light guide plate 400 is generally not a smooth surface, scattering reflection of light often occurs at the interface, thereby resulting in light leakage.

SUMMARY OF THE INVENTION

An object of the present invention is to provide a light guide plate, which has a top face on which a coating layer is formed to reflect light traveling to the top face back to the light guide plate in order to increase light intensity and homogeneity of the light guide plate.

Another object of the present invention is to provide a backlight module, which uses a light guide plate with coating layer to prevent light leakage and improve overall light intensity and homogeneity of the backlight module.

To achieve the objects, the present invention provides a light guide plate, which comprises: a plate body and a coating layer formed on the plate body. The plate body comprises a bottom face, a top face opposite to the bottom face, and a plurality of side faces between the bottom face and the top face. The coating layer is formed on at least one side edge of the top face. The coating layer has a refractive index that is greater than or equal to 1 and less than refractive index of the plate body.

The coating layer and a side edge of the top face form therebetween a gap.

The coating layer is formed along a side edge of the top face.

The coating layer is formed by printing or spraying.

The plate body is made of a material of PMMA, MS, or PC, which has a refractive index between 1.49-1.57.

The present invention also provides a backlight module, which comprises: a backplane, a backlighting source mounted inside the backplane, a reflection plate mounted inside the backplane, a light guide plate mounted on the reflection plate, an optic film assembly arranged above the light guide plate, and a mold frame mounted to the backplane. The light guide plate comprises a plate body and a coating layer formed on the plate body. The plate body comprises a bottom face, a top face opposite to the bottom face, and a plurality of side faces between the bottom face and the top face. The coating layer is formed on at least one side edge of the top face. The coating layer has a refractive index that is greater than or equal to 1 and less than refractive index of the plate body of the light guide plate. The backlighting source is mounted inside the backplane and opposes the side face of the light guide plate.

Area of the coating layer on the top face of the plate body of the light guide plate is within an area where the mold frame depresses on the light guide plate.

The coating layer is formed along a side edge of the top face or the coating layer forms a gap with respect to a side edge of the top face.

The coating layer is formed by printing or spraying.

The plate body is made of a material of PMMA, MS, or PC, which has a refractive index between 1.49-1.57.

The efficacy of the present invention is that the present invention provides a light guide plate, which comprises a coating layer formed on a top face thereof to reflect light that gets incident through a light incidence surface and travels to the top face of the light guide plate back into the light guide plate to confine the light to transmit within the light guide plate so as to prevent light leakage and ensure light intensity and homogeneity of the light guide plate. The structure is simple and the cost is low. The present invention also provides a backlight module, which makes use of a light guide plate that comprises a coating layer formed on a top face to effectively edge light leakage of the backlight module, improve optical grade of the module, and thereby facilitate bezel slimming of backlight module.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
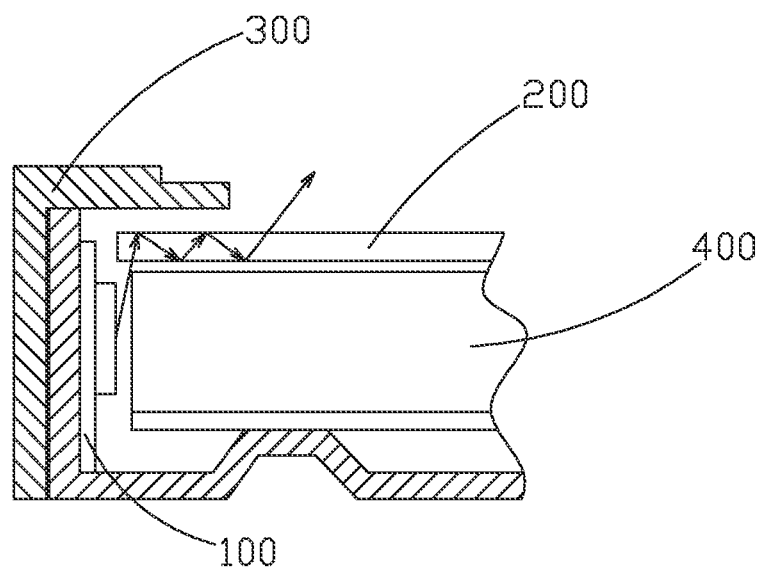
FIG. 1 is a schematic view showing the structure of a conventional backlight module.
Figure 2:
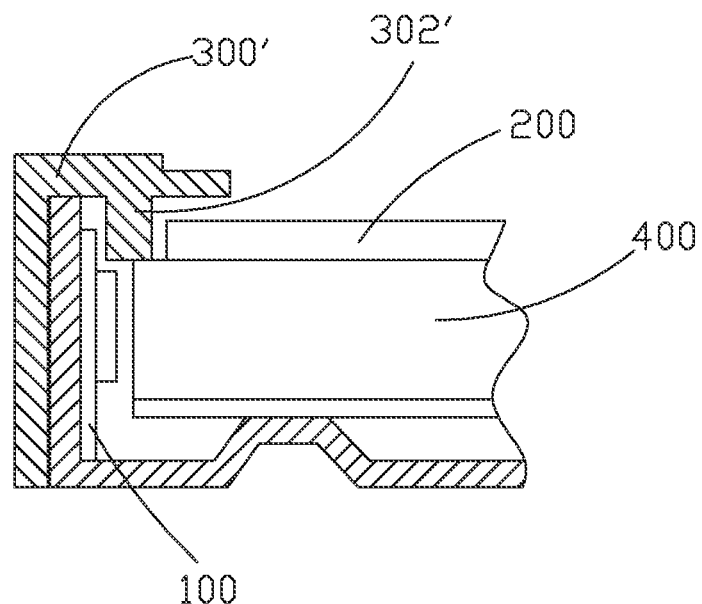
FIG. 2 is a schematic view showing an improved structure of the backlight module shown in FIG. 1.
Figure 3:
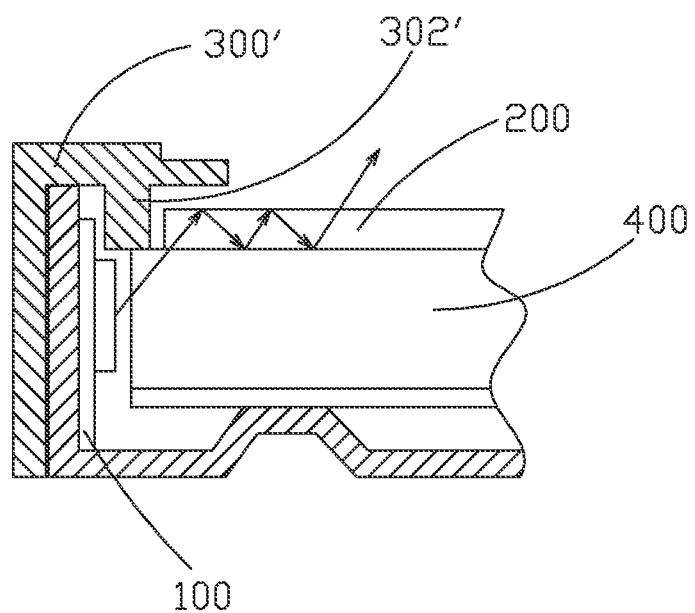
FIG. 3 is a schematic view showing propagation of light of the backlighting source shown in FIG. 2.
Figure 4:
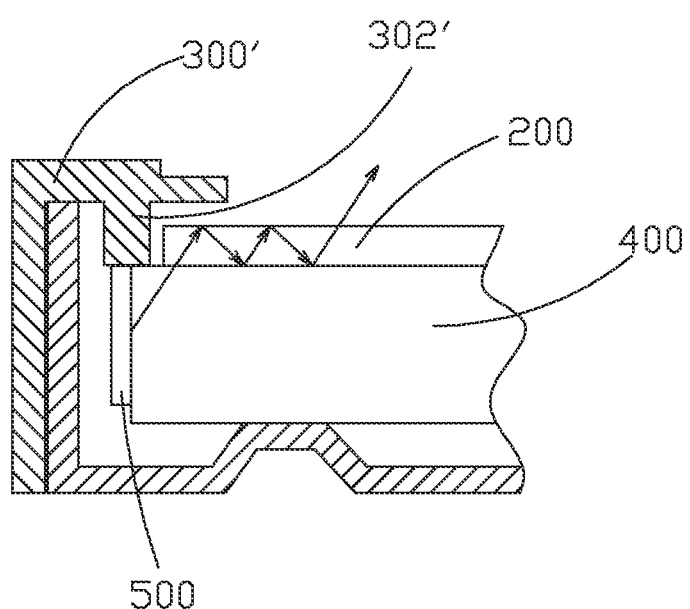
FIG. 4 is a schematic vie showing propagation of light of FIG. 2 after reflection by a side reflection plate.
Figure 5:
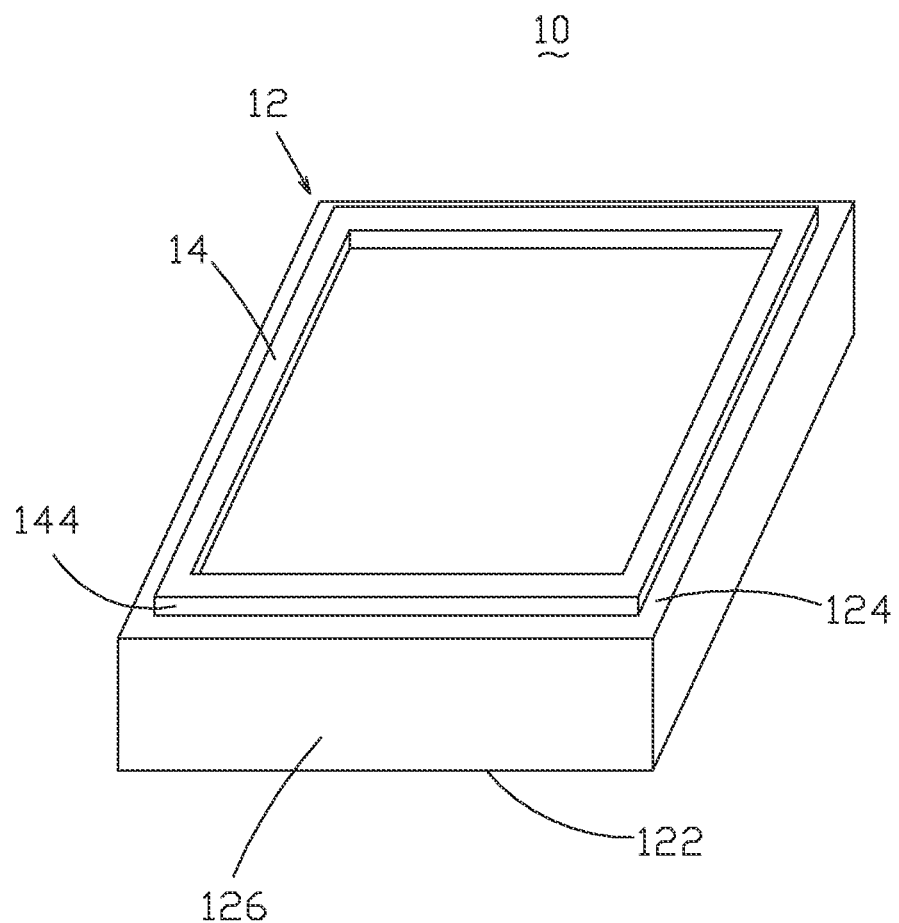
FIG. 5 is a perspective view showing a light guide plate according to an embodiment of the present invention.

Referring to FIG. 5, a light guide plate according to an embodiment of the present invention, generally designated at 10, comprises: a plate body 12 and a coating layer 14 formed on the plate body 12. The plate body 12 comprises a bottom face 122, a top face 124 opposite to the bottom face 122, and a plurality of side faces 126 between the bottom face 122 and the top face 124. The coating layer 14 is formed on at least one side edge of the top face 124. The coating layer 14 has a refractive index that is greater than or equal to 1 but less than refractive index of the plate body 12. The symbol "n" is used to indicate the refractive index of the coating layer, "$n_{air}$" the refractive index of air, and "$n_{LGP}$" the refractive index of the plate body 12 of the light guide plate 10. The refractive index of air is 1, namely $n \geq n_{air} = 1$ and $n < n_{LGP}$.

The coating layer 14 is made of a material that has a refractive index less than that of the plate body 12 but approximately corresponding to the refractive index of air. The coating layer 14 can be formed on the top face 124 of the plate body 12 of the light guide plate 10 by printing or spraying. The material that is used to make the plate body 12 of the light guide plate 10 can be PMMA (poly methyl methacrylate), MS (methyl methacrylate-styrene copolymer) or PC (polycarbonate), having a refractive index between 1.49-1.57.

In the instant embodiment, a gap is present between the coating layer 14 and the edge of the top face 124. In other words, an outer edge 144 of the coating layer 14 forms a predetermined gap with respect to the side faces 126 of the plate body 12. The coating layer 14 is formed along four side edges of the top face 124 so that the coating layer 14 is arranged in a rectangular form on the top face 124 of the plate body 12 of the light guide plate 10.

Figure 6:
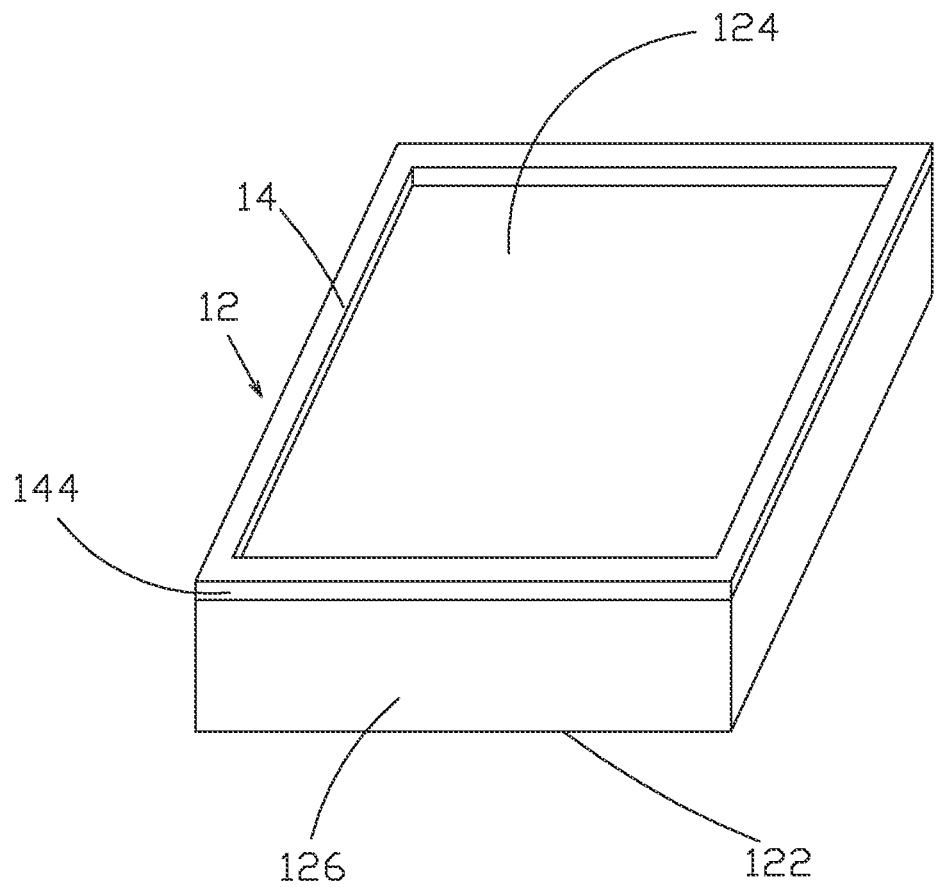
FIG. 6 is a perspective view showing a light guide plate according to another embodiment of the present invention.
Figure 7:
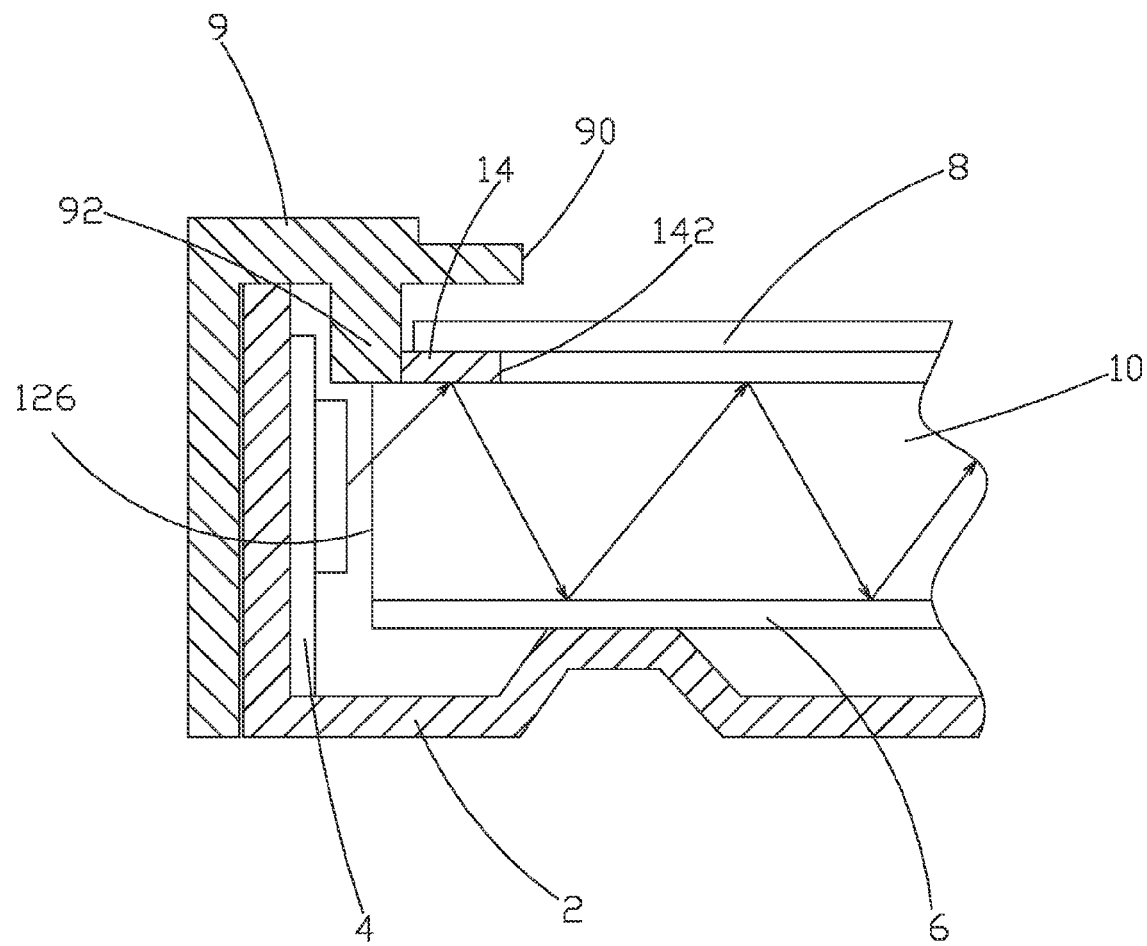
FIG. 7 is a schematic view showing the structure of a backlight module according to an embodiment of the present invention.

Referring to FIG. 6, a light guide plate according to another embodiment of the present invention, also designated at 10, is different from the previous embodiment in that the coating layer 14 is formed exactly on and along the side edges of the top face 124. In the instant embodiment, the coating layer 14 is formed to exactly follow the four side edges of the top face 124 so that the coating layer 14 is arranged in a rectangular form on the top face 124 of the plate body 12 of the light guide plate 10. In other words, the outer edge 144 of the coating layer 14 is substantially located on the same vertical plane as the corresponding side face 126 of the plate body 12 of the light guide plate 10. In the light guide plate 10 according to the present invention, when light enters from the side face 126 (light incidence surface) of the light guide plate 10 and propagates to interface between the plate body 12 of the light guide plate 10 and the coating layer 14, since the refractive index of the coating layer 14 is greater than or equal to 1 and smaller than the refractive index of the plate body 12, light moves from an optically thick medium, across the interface, into an optically thin medium, whereby when the incidence angle of the light is greater than the critical angle of total internal reflection, total internal reflection occurs. Taking a coating layer 14 having refractive index of 1.05 as an example, the plate body 12 of the light guide plate 10 is made of PMMA, of which the critical angle is 44.8 degrees and the critical angle of total reflection between PMMA and air is 42.2 degrees, whereby there is only a limited interval between 42.2 degrees and 44.8 degrees to allow the light to emit out, which is of a relatively small fraction so that light leakage can be effectively alleviated and light intensity and lighting homogeneity of the light guide plate 10 can be ensured. Referring to FIG. 7, in combination with FIG. 5, a backlight module containing the above described light guide plate according to an embodiment of the present invention comprises: a backplane 2, a backlighting source 4 mounted inside the backplane 2, a reflection plate 6 mounted inside the backplane 2, a light guide plate 10 mounted on the reflection plate 6, an optic film assembly 8 arranged above the light guide plate 10, and a mold frame 9 mounted to the backplane 2. The light guide plate 10 comprises a plate body 12 and a coating layer 14 formed on the plate body 12. The plate body 12 comprises a bottom face 122, a top face 124 opposite to the bottom face 122, and a plurality of side faces 126 between the bottom face 122 and the top face 124. The coating layer 14 is formed on at least one side edge of the top face 124. The coating layer 14 has a refractive index that is smaller than refractive index of the plate body 12 and the refractive index of the coating layer 14 is approximately corresponding to the refractive index of air. The optic film assembly 8 is positioned on the coating layer 14. The backlighting source 4 is arranged inside the backplane 2 and opposes the side face 126 of the light guide plate 10. The area of the coating layer 14 on the top face 124 of the plate body 12 of the light guide plate 10 is within an area where the mold frame 9 depresses on the light guide plate 10.

The coating layer 14 is made of a material that has a refractive index less than that of the plate body 12 but approximately corresponding to the refractive index of air. The coating layer 14 can be formed on the top face 124 of the plate body 12 of the light guide plate 10 by printing or spraying. The material that is used to make the plate body 12 of the light guide plate 10 can be PMMA (poly), MS (methyl methacrylate-styrene copolymer) or PC (polycarbonate), having a refractive index between 1.49-1.57.

Figure 8:
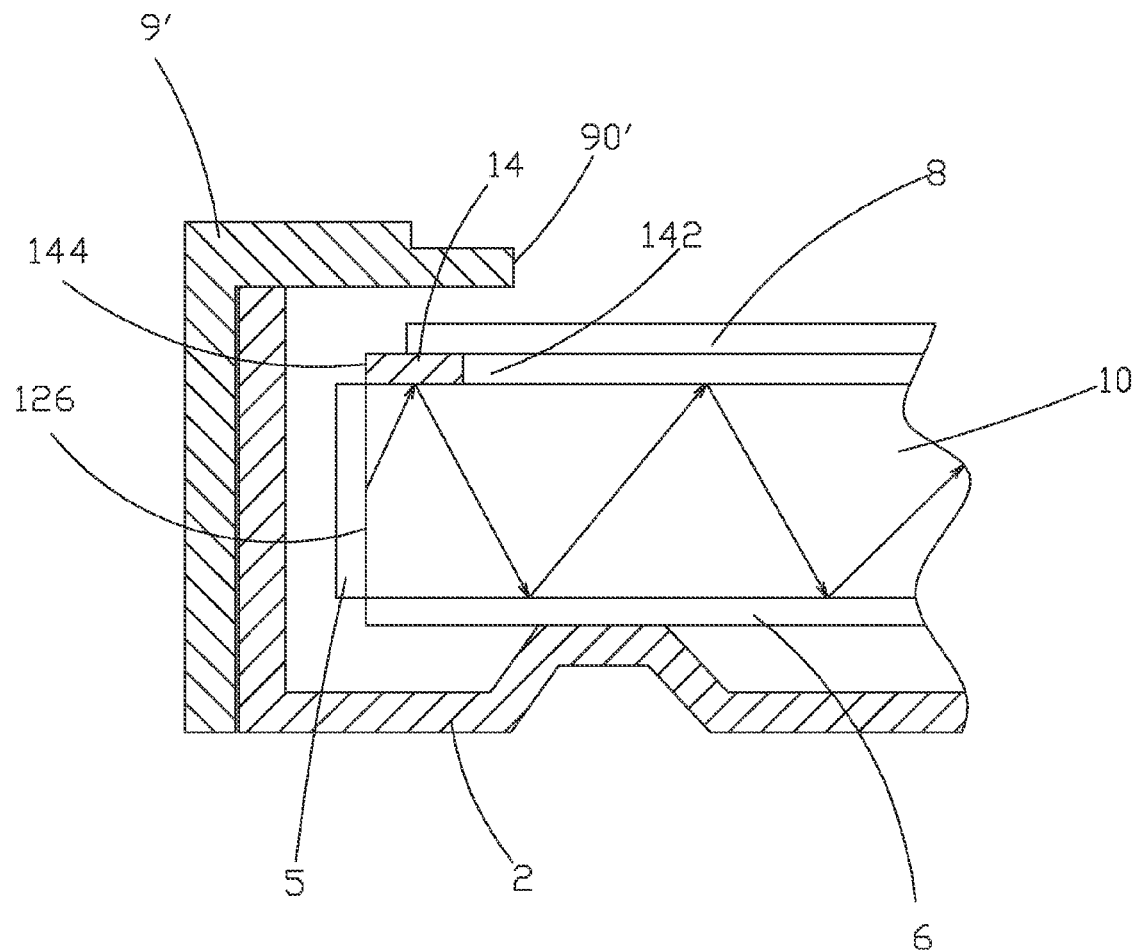
FIG. 8 is a schematic view showing the structure of a backlight module according to another embodiment of the present invention.

In the instant embodiment, a gap is present between the coating layer 14 and a side edge of the top face 124. In other words, an outer edge 144 of the coating layer 14 forms a gap with respect to a side edge of the top face 124. Preferably, the coating layer 14 is formed along four side edges of the top face 124 so that the coating layer 14 is arranged in a rectangular form on the top face 124 of the plate body 12 of the light guide plate 10. The mold frame 9 has a side that faces the backplane 2 and forms a shielding wall 92. In assembling, a lower end of the shielding wall 92 is positioned on the top face 124 of the plate body 12 of the light guide plate 10, generally positioned on the gap between the outside edge of the coating layer 14 and the side edge of the top face 124. The end of the mold frame 9 that is located above the light guide plate 10 covers the coating layer 14 of the light guide plate 10 so that an inside edge 142 of the coating layer 14 is not allowed to expose outside the coverage area of the mold frame 9. In other words, as shown in FIG. 7, the inside edge 142 of the coating layer 14 is located leftward of a side edge 90 of the mold frame 9 in the vertical direction. In the backlight module according to the present invention, light from the backlighting source 4 enters the light guide plate 10 from the light incidence surface of the side face 126 and the light traveling to the top face 124 is reflected by the coating layer 14 back into the light guide plate 10 (propagation direction of light being indicated by arrows) so as to prevent the light from transmitting through the light guide plate 10 to directly get into the optic film assembly 8 and cause loss of light, thereby effectively improving edge leakage phenomenon of the backlight module and enhancing optical grade of the module. Referring to FIG. 8, in combination with FIG. 6, a backlight module containing the above described light guide plate 10 according to another embodiment of the present invention comprises: a backplane 2, a backlighting source 4 mounted inside the backplane 2, a reflection plate 6 mounted inside the backplane 2, a light guide plate 10 mounted on the reflection plate 6, an optic film assembly 8 arranged above the light guide plate 10, and a mold frame 9' mounted to the backplane 2. The light guide plate 10 comprises a plate body 12 and a coating layer 14 formed on the plate body 12. The plate body 12 comprises a bottom face 122, a top face 124 opposite to the bottom face 122, and a plurality of side faces 126 between the bottom face 122 and the top face 124. The coating layer 14 is formed on at least one side edge of the top face 124. The coating layer 14 has a refractive index that is smaller than refractive index of the plate body 12 and the refractive index of the coating layer 14 is approximately corresponding to the refractive index of air. The optic film assembly 8 is positioned on the coating layer 14. The backlighting source 4 is arranged inside the backplane 2 and opposes the side face 126 of the light guide plate 10. The area of the coating layer 14 on the top face 124 of the plate body 12 of the light guide plate 10 is within an area where the mold frame 9' depresses on the light guide plate 10.

The coating layer 14 is made of a material that has a refractive index less than that of the plate body 12 but approximately corresponding to the refractive index of air. The coating layer 14 can be formed on the top face 124 of the plate body 12 of the light guide plate 10 by printing or spraying. The material that is used to make the plate body 12 of the light guide plate 10 can be PMMA (poly), MS (methyl methacrylate-styrene copolymer) or PC (polycarbonate), having a refractive index between 1.49-1.57.

In the instant embodiment, the mold frame 9' comprises no shielding wall, and the coating layer 14 is formed exactly on the side edge of the top face 124. In other words, the outer edge 144 of the coating layer 14 is substantially located on the same vertical plane as the corresponding side face 126 of the plate body 12 of the light guide plate 10. Preferably, the coating layer 14 is formed along four side edges of the top face 124 so as to be arranged in a rectangular form on the top face 124 of the plate body 12 of the light guide plate 10. The inside edge 142 of the coating layer 14 is located within the coverage area of the mold frame 9'. In other words, as shown in FIG. 8, the inside edge 142 of the coating layer 14 is located leftward of a side edge 90' of the mold frame 9' in the vertical direction.

In the instant embodiment, the backlight module further comprises a side reflection plate 5 that is attached to the side face 126 of the light guide plate 10. Upon reflection by the side reflection plate 5, light is reflected by the coating layer 14 back into the light guide plate 10 (propagation direction of light being indicated by arrows) so as to prevent light leakage and further improve overall light intensity and homogeneity of the backlight module.

In summary, the present invention provides a light guide plate, which comprises a coating layer formed on a top face thereof to reflect light that gets incident through a light incidence surface and travels to the top face of the light guide plate back into the light guide plate to confine the light to transmit within the light guide plate so as to prevent light leakage and ensure light intensity and homogeneity of the light guide plate. The structure is simple and the cost is low. The present invention also provides a backlight module, which makes use of a light guide plate that comprises a coating layer formed on a top face to effectively edge light leakage of the backlight module, improve optical grade of the module, and thereby facilitate bezel slimming of backlight module.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A light guide plate, comprising: a plate body and a coating layer formed on the plate body, the plate body comprising a bottom face, a top face opposite to the bottom face, and a plurality of side faces between the bottom face and the top face, the coating layer being formed on the top face of the plate body and extending circumferentially along edge margins of the top face to enclose and delimit a central portion of the top face, the coating layer having a refractive index that is greater than or equal to 1 and less than refractive index of the plate body.

2. The light guide plate as claimed in claim 1, wherein the coating layer is formed on the top face in such way that an outer edge of the coating layer is spaced inwardly from a corresponding one of the side faces of the plate body so as to define a distance on the top face of the plate body between the side face of the plate body and the outer edge of the coating layer.

3. The light guide plate as claimed in claim 1, wherein the coating layer is formed on the top face in such a way that an outer edge of the coating layer is in alignment with a corresponding one of the side faces of the plate body.

4. The light guide plate as claimed in claim 1, wherein the coating layer is formed by printing or spraying.

5. The light guide plate as claimed in claim 1, wherein the plate body is made of a material of Poly(methyl methacrylate) (PMMA), Methyl Methacrylate (MMA) Styrene Copolymer (MS), or Polycarbonate (PC), which has a refractive index between 1.49-1.57.

6. A backlight module, comprising: a backplane, a backlighting source mounted inside the backplane, a reflection plate mounted inside the backplane, a light guide plate mounted on the reflection plate, an optic film assembly arranged above the light guide plate, and a mold frame mounted to the backplane, the light guide plate comprising a plate body and a coating layer formed on the plate body, the plate body comprising a bottom face, a top face opposite to the bottom face, and a plurality of side faces between the bottom face and the top face, the coating layer being formed on the top face of the plate body and extending circumferentially along edge margins of the top face to enclose and delimit a central portion of the top face, the coating layer having a refractive index that is greater than or equal to 1 and less than refractive index of the plate body of the light guide plate, the backlighting source being mounted inside the backplane and opposing the side face of the light guide plate.

7. The backlight module as claimed in claim 6, wherein an area of the coating layer on the top face of the plate body of the light guide plate is within an area where the mold frame depresses on the light guide plate.

8. The backlight module as claimed in claim 6, wherein the coating layer is formed on the top face in such a way that an outer edge of the coating layer is in alignment with a corresponding one of the side faces of the plate body or an outer edge of the coating layer is spaced inwardly from a corresponding one of the side faces of the plate body so as to define a distance on the top face of the plate body between the side face of the plate body and the outer edge of the coating layer.

9. The backlight module as claimed in claim 6, wherein coating layer is formed by printing or spraying.

10. The backlight module as claimed in claim 6, wherein the plate body is made of a material of Poly(methyl methacrylate) (PMMA), Methyl Methacrylate (MMA) Styrene Copolymer (MS), or Polycarbonate (PC), which has a refractive index between 1.49-1.57.

11. A backlight module, comprising: a backplane, a backlighting source mounted inside the backplane, a reflection plate mounted inside the backplane, a light guide plate mounted on the reflection plate, an optic film assembly arranged above the light guide plate, and a mold frame mounted to the backplane, the light guide plate comprising a plate body and a coating layer formed on the plate body, the plate body comprising a bottom face, a top face opposite to the bottom face, and a plurality of side faces between the bottom face and the top face, the coating layer being formed on the top face of the plate body and extending circumferentially along edge margins of the top face to enclose and delimit a central portion of the top face, the coating layer having a refractive index that is greater than or equal to 1 and less than refractive index of the plate body of the light guide plate, the backlighting source being mounted inside the backplane and opposing the side face of the light guide plate;
wherein an area of the coating layer on the top face of the plate body of the light guide plate is within an area where the mold frame depresses on the light guide plate;
wherein the coating layer is formed on the top face in such a way that an outer edge of the coating layer is in alignment with a corresponding one of the side faces of the plate body or an outer edge of the coating layer is spaced inwardly from a corresponding one of the side faces of the plate body so as to define a distance on the top face of the plate body between the side face of the plate body and the outer edge of the coating layer;
wherein the coating layer is formed by printing or spraying; and
wherein the plate body is made of a material of Poly(methyl methacrylate) (PMMA), Methyl Methacrylate (MMA) Styrene Copolymer (MS), or Polycarbonate (PC), which has a refractive index between 1.49-1.57.

* * * * *